US006400479B1

(12) United States Patent
Zhou et al.

(10) Patent No.: US 6,400,479 B1
(45) Date of Patent: Jun. 4, 2002

(54) OPTICAL POWER BALANCER FOR OPTICAL AMPLIFIED WDM NETWORKS

(75) Inventors: Jianying Zhou, Acton; Richard A. Barry, Brookline; Naimish Patel, North Andover, all of MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/467,607

(22) Filed: Dec. 20, 1999

(51) Int. Cl.$^7$ .................. H04B 10/00; H04B 10/12; H04B 10/08
(52) U.S. Cl. .................. 359/134; 359/161; 359/166; 359/177; 359/187
(58) Field of Search .................. 359/124, 132, 359/133, 159, 161, 166, 173, 177, 187, 188, 194, 195

(56) References Cited

U.S. PATENT DOCUMENTS

| | | | |
|---|---|---|---|
| 5,225,922 A | | 7/1993 | Charplyvy et al. ......... 359/124 |
| 5,406,404 A | * | 4/1995 | Digiovanni .................. 359/161 |
| 5,764,406 A | * | 6/1998 | Newhouse .................. 359/341 |
| 5,801,860 A | * | 9/1998 | Yoneyama .................. 359/124 |
| 5,808,760 A | * | 9/1998 | Gfeller ......................... 359/110 |
| 5,920,414 A | * | 7/1999 | Miyachi ....................... 359/133 |
| 6,185,022 B1 | * | 2/2001 | Harasawa .................... 359/124 |

OTHER PUBLICATIONS

Willner et al.., "Transmission of Many WDM Channels Through a Cascade of EDFA's in Long–Distance Links and Ring Networks" Journal of Lightwave Technology 13:802–816 (1995).

Zyskind et al., "Erbium–Doped Fiber Amplifiers for Optical Communications" Optical Fiber Telecommunications vol. IIIB, Chapter 2 pp 13–42 (1997).

* cited by examiner

Primary Examiner—Jason Chan
Assistant Examiner—Agustin Bello
(74) Attorney, Agent, or Firm—Weingarten, Schurgin, Gagnebin & Lebovici LLP

(57) ABSTRACT

A wavelength division multiplexed (WDM) optical communications network is configured and operated to enable transmitter output power for a given wavelength channel to be adjusted to achieve a desired optical signal-to-noise ratio (OSNR) for the channel independently of the power levels of other optical signals carried on the same path. Optical amplifiers in the optical links extending between the transmitter and an optical receiver are configured to operate with constant gain over a specified range of input optical signal power, and the links are configured such that the power level of the signal provided to each optical amplifier is within the specified range of input signal power to prevent the deep saturation of the optical amplifiers due to optical amplifier cascading. When a channel is being added or adjusted, the OSNR of the optical communications signal received by the receiver is measured, and the power of the signal transmitted by the transmitter is adjusted to attain a desired OSNR at the receiver. Due to the constant-gain operation and input power control of the optical amplifiers, the OSNRs of other signals carried on the path are not affected, so that it is unnecessary to adjust the output power of other transmitters providing signals to the path.

14 Claims, 3 Drawing Sheets

OPTICAL POWER BALANCER FOR OPTICAL AMPLIFIED WDM NETWORKS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of optical communications networks employing optical amplifiers, and more particularly to methods of controlling the optical signal-to-noise (OSNR) ratios of optical channels in optical communications networks.

The use of wavelength division multiplexing (WDM) technologies and optical amplifiers has enabled the traffic-carrying capacity of optical communications networks to be increased without requiring the installation of new fibers. However, certain undesirable characteristics of optical amplifiers, for example erbium-doped fiber amplifiers (EDFAs), require special consideration to achieve desired network performance. One such characteristic is amplified spontaneous emission (ASE) noise generated by the amplifier during operation. The ASE noise mixes with the amplified optical signal, and reduces the ability of downstream circuitry to faithfully recover data from the signal. Additionally, the gain of EDFAs and other optical amplifiers is not constant across the band of wavelengths that constitute a typical WDM signal. Generally, some form of equalization of EDFA gain is required in order to provide adequate amplification of all wavelengths along the paths from the transmitters to the respective receivers.

Another factor complicating the design of optical communications networks is the need for very general network topologies, to provide maximum flexibility in meeting the communications needs of users. Many optical links today are point-to-point, "backbone" segments of wide-area networks, such as the long-distance telephone system. In such applications, upgrading or re-configuring a link can be performed relatively easily, because all of the equipment that interfaces to a given end of the link is generally co-located. However, the increasing use of the Internet and other data services is creating a demand for more arbitrary optical network configurations. For example, organizations having a number of geographically separated sites may require a general mesh connection of optical links among the various sites. Performing an upgrade in networks with such arbitrary connections is more complicated than in point-to-point networks, because the various pieces of equipment that provide signals to a given link may not be co-located.

One known technique for equalizing transmission characteristics in optical networks is shown in U.S. Pat. No. 5,225,922 to Chraplyvy et al., entitled "Optical Transmission System Equalizer". The output powers and signal-to-noise ratios of different optical channels are selectively equalized by measuring the signal-to-noise ratios of all signals received at one end of a multi-link transmission path, and iteratively adjusting the output powers of all transmitters that provide input signals to the path until the signal-to-noise ratio in each channel is within acceptable limits. The iterative nature of the equalization algorithm arises from the fact that a significant change in the signal power of a channel (such as when a new channel is added as part of an upgrade) affects the ASE in other channels. The channels must be adjusted together, and generally multiple times, to achieve the desired equalization across all channels.

While the technique of Chraplyvy et al. provides good equalization of a point-to-point WDM transmission path, its use in more arbitrary network configurations is generally infeasible. A network user adding or changing a given channel may not have access to the transmitters that provide the other optical signals existing on the path, and therefore cannot carry out the necessary re-adjustment of these transmitters to achieve acceptable signal-to-noise ratios in all channels. Additionally, the technique is relatively complex due to its reliance on iterated measurement and adjustment. It would be desirable to enable the upgrading or re-configuring of an optical communications network to obtain desired signal-to-noise ratios in both new and existing channels without requiring the readjustment of the transmitters of existing optical signals.

BRIEF SUMMARY OF THE INVENTION

In accordance with the present invention, an optical communications network is disclosed in which the transmitter output power for a given channel can be adjusted to achieve a desired channel OSNR independent of the power levels of other optical signals carried on the same path. Channels can be added, dropped, or changed without the need for a complex equalization process and without requiring access to the transmitters for other signals existing on the same path.

In the disclosed network, the optical amplifier in each optical link extending between an optical transmitter and an optical receiver is configured to operate with constant gain over a specified range of input optical signal power, and is also configured such that the power level of the optical signal provided to each optical amplifier is within the specified range of input optical signal power. When a channel is being added or adjusted, the optical signal-to-noise ratio (OSNR) of the optical signal received at the receiver is measured, and the power of the signal transmitted by the transmitter is adjusted to attain a desired OSNR at the receiver. The OSNRs of other signals carried on the path are not affected, due to the constant-gain operation of the optical amplifiers, and therefore no adjustments of other transmitters are required. Upgrading or re-configuring paths in the network is generally much simpler than in prior optical networks. As a result, barriers to the use of arbitrary optical network configurations such as add/drop, ring, etc., are reduced, and the benefits of optical communications can be more widely enjoyed.

Other aspects, features, and advantages of the present invention are disclosed in the detailed description that follows.

DETAILED DESCRIPTION OF THE INVENTION

Figure 1:
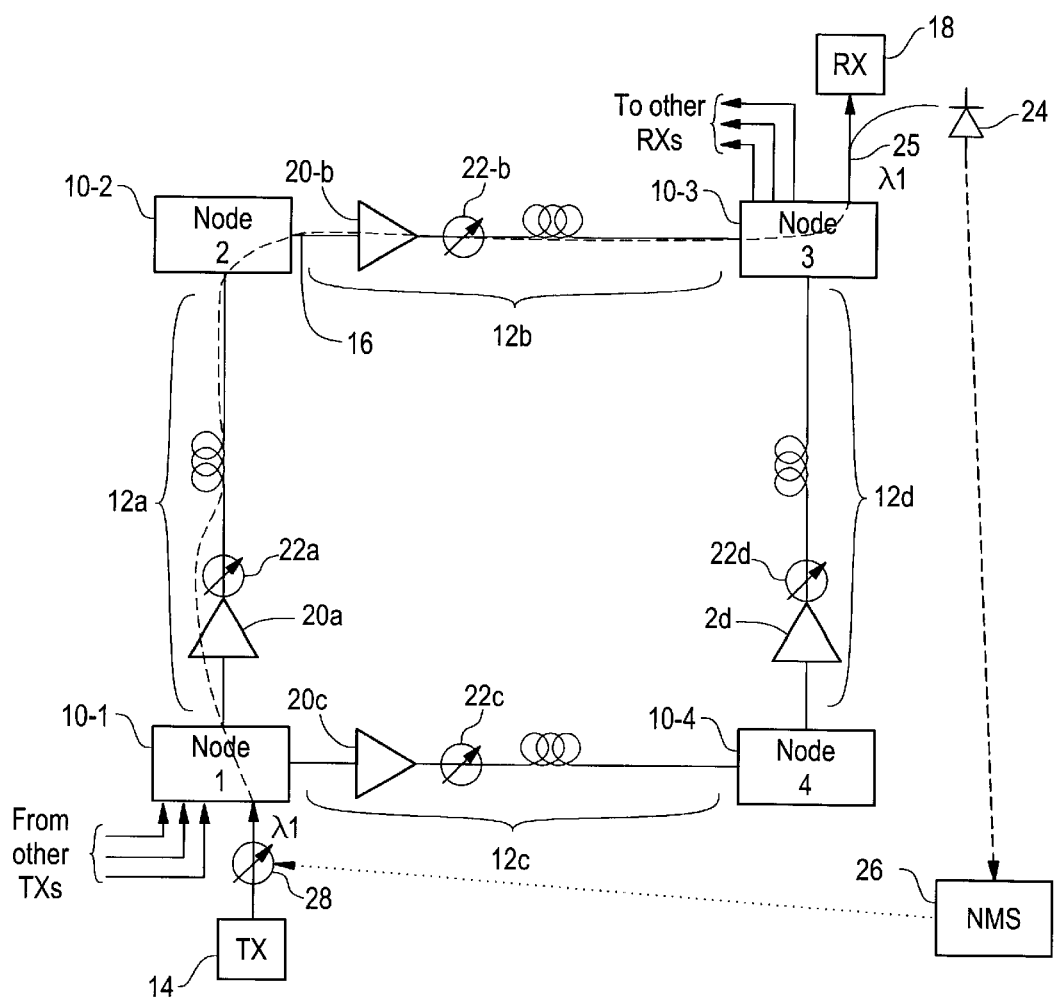
FIG. 1 is a block diagram of an example optical communications network in accordance with the present invention.

FIG. 1 shows a simplified mesh-connected optical communications network having a number of network nodes 10-1 through 10-4 interconnected by respective optical communications links 12a through 12d. Each link 12 carries a number of optical communications signals of different wavelengths, according to the above-mentioned technique of wavelength division multiplexing (WDM). A transmitter 14 generates an optical communications signal at a wavelength λ1, which traverses a wavelength channel 16 through nodes 10-1, 10-2 and 10-3 to a receiver 18. Each optical communications link 12 has one or multiple fiber spans, each fiber span including a length of optical fiber, an optical amplifier 20 and a variable optical attenuator (VOA) 22. For simplicity, only one span is shown in each link. For example, optical communications link 12a includes the amplifier 20a and the VOA 22a, etc.

A photodetector 24 is used at the receiver 18 to measure the optical power of the received optical signal through a taper coupler 25 at wavelength λ4 from the channel 16. The output of the photodetector 24 is provided to a network management system (NMS) 26, which in turn is communicatively coupled to a VOA 28 at the output of the transmitter 14. The path from the photodetector 24 to the VOA 28 via the NMS 26 is used to adjust the power of the optical signal provided to the channel 16 in a manner described below.

Although only one path 16 is shown in FIG. 1, in general there are a number of similar communications paths between respective transmitter/receiver pairs in the network. Each node 10 may have locally connected transmitters and/or receivers, in addition to the connections to incoming and outgoing links 20. The paths between different transmitter/receiver pairs generally traverse different sets of nodes 10. Also, each link 20 is typically paired with a corresponding link (not shown) to form a bidirectional channel. Also, some links between nodes may only include one span with a length of optical fiber without an optical amplifier. Some nodes may have optical amplifiers inside. These details have been omitted from FIG. 1 for simplicity.

Figure 2:
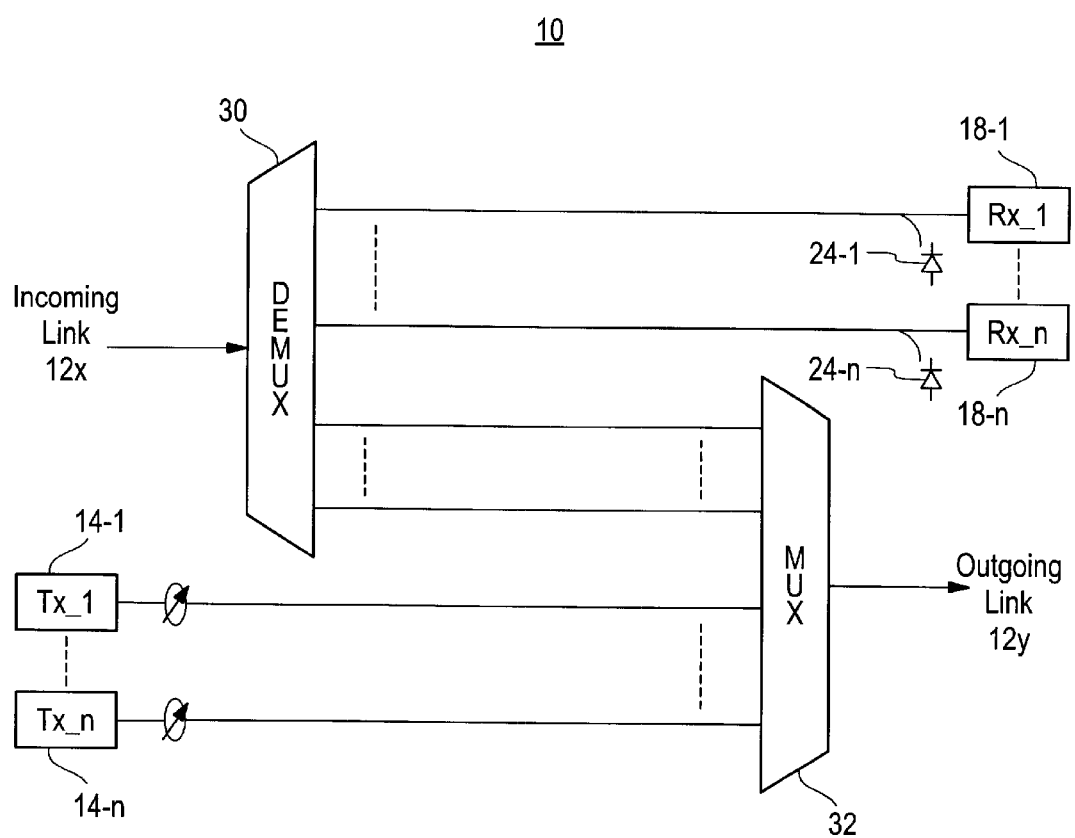
FIG. 2 is a block diagram showing the general configuration of nodes in the network of FIG. 1.

FIG. 2 shows the general configuration of a node 10. The WDM signal from an incoming link 12 is provided to an optical demultiplexer 30, which separates the various components of the WDM signal. The demultiplexed signals for channels that terminate at the node 10 are provided to receivers 18 that are connected to the node 10. Those demultiplexed signals for channels passing through the node 10 are provided to an optical multiplexer 32, along with input optical signals from transmitters 14 connected to the node 10. The WDM signal created by the multiplexer 32 is placed on an outgoing link 20 for transmission to a neighboring node 10.

Returning to FIG. 1, each optical amplifier 20 in the network is a source of "amplified spontaneous emission" (ASE) noise that mixes with the information-bearing component of the optical signals and degrades system performance. One general measure of performance is the bit error rate (BER), which is the rate at which information bits carried by a channel are erroneously changed into incorrect values. The BER, in turn, is a function of the optical signal-to-noise ratio (OSNR) of the channel. A major component of the optical noise is the cumulative ASE noise generated along the path between transmitter and receiver.

Figure 3:
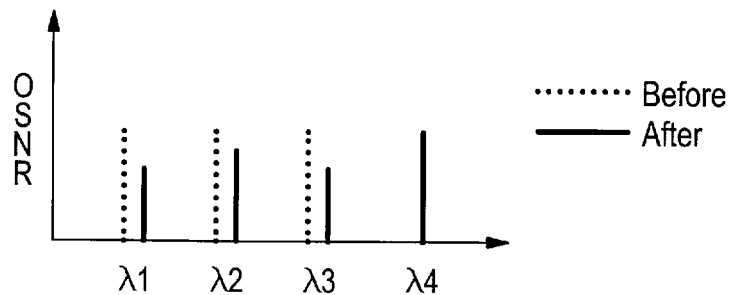
FIG. 3 is a graph illustrating the effect of adding an optical communications signal of one wavelength on respective optical signal-to-noise ratios (OSNRs) of existing optical communications signals of other wavelengths in a prior art optical communications network.

It is generally possible to adjust the transmitted power level of an optical signal to yield a desired OSNR at the receiver, even in the presence of ASE noise, so as to reduce the channel's bit error rate to below a maximum acceptable level. However, there can be an interplay between transmitted power level and the level of cumulative ASE noise. This effect as experienced in prior art optical networks is illustrated in FIG. 3. In FIG. 3, the dashed lines represent the OSNR of three optical channels carrying optical signals at respective wavelengths λ1, λ2, and λ3. As shown, these OSNR values are initially equal. The solid lines represent the OSNRs after a fourth optical signal at wavelength λ4 has been added to the path. As shown, the OSNRs of the three original channels have diminished. The diminished OSNRs result in correspondingly reduced BERs for these channels, so that the performance of these channels is degraded.

In prior optical networks, such as the network in the above-mentioned Chraplyvy patent, an equalization process is performed whenever a new channel is added, in order to reestablish acceptable OSNRs in all channels. In the Chraplyvy patent, this process involves iteratively adjusting the power levels of the optical signals generated by all the transmitters that provide signals to a given path, until each channel experiences the desired OSNR. As mentioned above, this technique is cumbersome, and is infeasible to perform in many network topologies.

Figure 4:
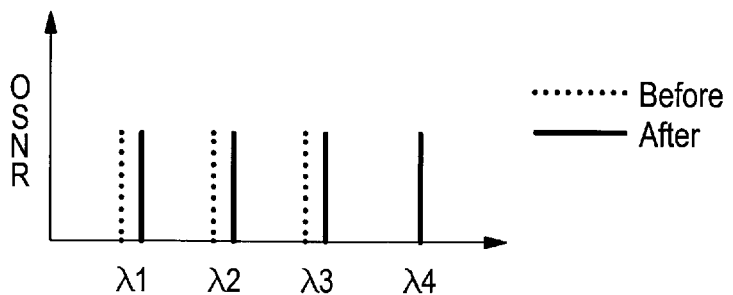
FIG. 4 is a graph illustrating the effect of adding an optical communications signal of one wavelength on respective OSNRs of existing optical communications signals of other wavelengths in the optical communications network of FIG. 1.

The network of FIG. 1 is operated in a manner that enables new channels to be created without adversely affecting the OSNRs of existing channels and without requiring an output power adjustment for all transmitters that provide signals to the affected path. The results are illustrated in FIG. 4. In FIG. 4, it will be observed that the OSNRs of the original three channels do not decrease when the channel operating at λ4 is added. Thus, the only required adjustment is the adjustment of the VOA 28 needed to obtain the desired OSNR for the new channel; the transmitters for existing signals do not require adjustment.

The technique exploits the fact that the ASE noise generated by a given optical amplifier is dependent only on the gain of the amplifier, which can be shown as follows. The ASE noise at individual optical amplifiers can be expressed by the following equation:

$$P\_ASE(\lambda) = h\nu N\_sp(\lambda)[G(\lambda)-1]B(\lambda) \tag{1}$$

where $B(\lambda)$ is optical bandwidth, and $N\_sp(\lambda)$ is spontaneous emission factor. $N\_sp(\lambda)$ can be expressed in terms of the amplifier noise figure $NF(\lambda)$ as follows:

$$N\_sp(\lambda) = NF(\lambda)/2 \tag{2}$$

When the amplifier is in a deep saturated condition (i.e., amplifier gain changes as input power changes), both $N\_sp(\lambda)$ as well as $NF(\lambda)$ will increase when the amplifier input power increases. Deep saturation is the condition when the input power of an optical amplifier is so high that the amplifier cannot provide enough output power for a given gain. However, in the non-deep-saturation condition, both $N\_sp(\lambda)$ as well as $NF(\lambda)$ are substantially independent of input power.

Accordingly, each optical amplifier 20 in the network of FIG. 1 is operated in a constant-gain mode, meaning that the power gain of the amplifier 20 is held constant regardless of input signal level, as long as the input signal level is low enough to prevent the amplifier 20 from entering deep saturation. Constant-gain operation can be achieved by a variety of known techniques. For example, the gain of an optical amplifier 20 can be measured by monitoring input and output power using tap couplers and PIN diode detectors. Constant gain operation is achieved using feedback to control the current to the amplifier's pump lasers.

As mentioned above, there are generally multiple fiber spans in each link 12, with at least one optical amplifier 20 between spans. Thus, on a given link 12 there is a cascade of optical amplifiers 20 from the beginning of the link 12 to the end of the link 12. In the event that the average gain of the optical amplifiers 20 in a link 12 exceeds the average loss of the fiber spans, then the input signal power to each amplifier 20 would tend to increase for successive amplifiers in the cascade, possibly driving one or more of the last amplifiers 20 into deep saturation. The VOAs 22 are used to prevent such a situation from occurring. The VOAs 22 are adjusted based on the actual span losses and amplifier gains to ensure that the input power to each optical amplifier 20 is within the desired range to ensure constant-gain operation, i.e., low enough to prevent the amplifier 20 from entering deep saturation and high enough to achieve desirable OSNR performance. The overall loss of each span can be measured by monitoring the output power of the optical amplifier that drives the span and the input power to the optical amplifier at the end of the span.

In FIG. 1, for example, if it is assumed that the gain and maximum output power of the optical amplifiers 20-*a* and 20-*b* are 28 dB and 21 dBm, respectively, and there are 40 channels in links 12-*a* and 12-*b*, the VOA is used to adjust the span loss (between the output of optical amplifier 20-*a* and the input of optical amplifier 20-*b*) to 28 dB. The input power of optical amplifier 20-*a* is then −23 dBm for one channel and −7 dBm for all 40 channels. The output power of the optical amplifier 20-*a* is +5 dBm for one channel and 21 dBm for when fully loaded with 40 channels.

Once the optical amplifiers 20 along a path are operating in constant-gain mode, the cumulative ASE generated along the path is substantially constant regardless of the channel power level, as long as the input power is within the desired range. When a new channel is added, the power gain at each optical amplifier 20 does not change, as long as the added channel does not alter the constant-gain operation of the amplifiers 20 along the path of the channel. Accordingly, there is no change in the OSNR for existing signals on the path, so that it is unnecessary to adjust the output power of the transmitters generating the existing signals.

The following simple algorithm can then be used to attain the desired OSNR for a new channel:

1. Measure the OSNR of the channel at the receiver 18.
2. If OSNR is not within an acceptable tolerance of the desired OSNR, the output power of the transmitter 14 for the new channel is adjusted until the OSNR is within the acceptable tolerance of the desired OSNR. The following formula can be used to calculate the amount of transmitter output power adjustment:

$$Tx\_adjust = OSNR - OSNR\_desired \text{(dB)} \quad (3)$$

OSNR can be measured in various ways. It is normally measured using a dedicated instrument such as an optical spectrum analyzer or wavemeter. Alternatively, as described below, special power monitor circuitry at the receiver can be used for OSNR measurement capability, as the channel OSNR is independent of the adding/dropping of other channels. This approach eliminates the requirement for dedicated instruments, and thus is more cost effective. Also, such a power monitoring facility is more easily integrated into the NMS for operation through a controller.

The channel OSNR is measured by measuring power at the receiver when the transmitter for a channel is off and when the transmitter is on, and calculating the ratio of these two values. If the powers are expressed in dB units, then the OSNR in dB is simply the difference between the dB values for these powers. Thus, the OSNR at channel i is calculated by evaluating the following expression:

$$OSNR\_i = P\_signal\_on - P\_i\_ase\_ref \quad (4)$$

where:

$$P\_i\_ase\_ref = P\_i\_signal\_off - Convertfactor\_i \quad (5)$$

P_i_signal_on is the signal power measured at the receiver when the transmitter channel i is turned on. P_i_signal_off is the power measured at the receiver when the transmitter channel i is turned off. Although this value itself represents ASE noise, it is measured through a demultiplexer filter (not shown) whose bandwidth can vary. Thus, a calibration factor Convertfactor_i is used to convert the ASE noise measured through the demultiplexer filter, P_i_signal_off, into an ASE noise value for a reference pass band (e.g. 0.1 nm), P_i_ase_ref. The value of Convertfactor_i is a predetermined constant value that is dependent on the shape and bandwidth of the response of the demultiplexer filter.

Figure 5:
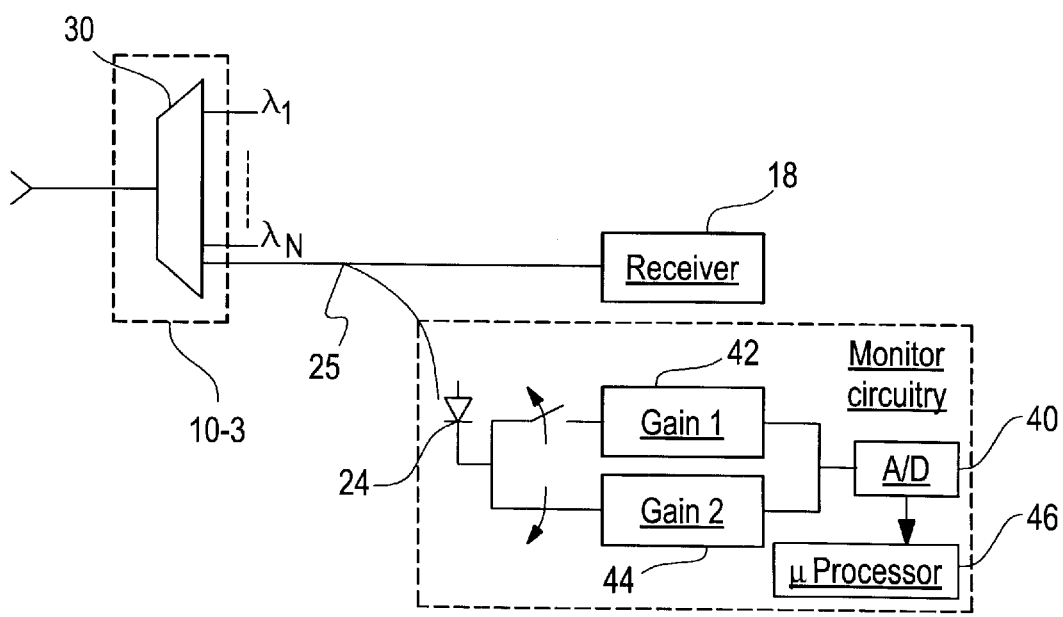
FIG. 5 is a diagram of power monitoring circuitry for OSNR measurement in a receiver in the network of FIG. 1.

FIG. 5 shows an example of power monitor circuitry used for OSNR measurement at the receiver 18. As shown, this circuitry receives a portion of the optical signal for a given wavelength $\lambda_N$, as generated by the de-multiplexer 30, through a taper coupler 25. As ASE noise is relatively low compared to the data signal, so that a fairly large dynamic range is required, dual-gain circuitry is used. Thus, the output of the PIN diode 24 is provided to an analog-to-digital (A/D) converter 40 and microprocessor 42 through either a high-gain block 44 or a lower-gain block 46. The gain block to be used (high or low) can be automatically set for signal and ASE measurements. Different high gain and low gain parameters will provide different OSNR measurement capability. For example, a high gain with 200 volt/mw and a low gain with 10 volt/mw (counted from the optical input of the taper coupler 25 to the output of the respective gain block 46 or 44) can provide an OSNR measurement range of at least 5 dB to 35 dB with nominal input signal power of −10 dBm at receiver. The OSNR information can be used by an operator to manually adjust the power level of the optical signal via the VOA 28. Alternatively, the information can be used by the NMS in an automated adjustment of the VOA 28.

As an example of the above algorithm, it is assumed that the desired OSNR is 20 dB. Initially, the OSNR of a channel measured at the receiver is 15 dB. Therefore, the output power of the transmitter is increased by 5 dB. As long as the optical amplifiers remain in constant-gain operation, the output signal power also increases by 5 dB, without an appreciable increase in ASE noise. Therefore, the resulting OSNR of the new channel is 20 dB. Of course, the algorithm can be repeated if desired, to ensure the desired results are obtained.

The maximum output power of optical amplifiers limits the maximum channel count for a given link for any control mode of optical amplifiers, including free running (constant current control mode). A planned upgrade should not require that the output power of the optical amplifiers exceeds the maximum output power when the systems are fully loaded by all desired channels. If an upgrade were to require enough additional signal power to take the amplifiers out of constant gain operation, the BER performance of the signal channels would degrade. The techniques disclosed herein simplify network operation and upgrading, and as a result system performance is optimized.

Although in the illustrated embodiment the VOAs 22 are shown at the outputs of the respective amplifiers 20, in alternative embodiments one or more VOAs 22 can be placed before the respective amplifiers 22, or even within one or more amplifiers 22. It may also be possible to dispense with one or more VOAs 22, as long as the signal levels are controlled such that constant-gain operation of the amplifiers 22 is assured.

A technique for achieving optical power balancing in an optical communications network has been described. It will be apparent to those skilled in the art that modifications to and variations of the above-described technique are possible without departing from the inventive concepts disclosed herein. Accordingly, the invention should be viewed as limited solely by the scope and spirit of the appended claims.

What is claimed is:

1. An optical communications network, comprising:
   a number of cascaded optical links extending between an optical transmitter and a corresponding optical receiver, each optical link having one or multiple fiber spans, each fiber span including (i) an optical fiber operative to carry wavelength-division multiplexed (WDM) optical communications signals in the direction from the transmitter to the receiver, and (ii) an optical amplifier coupled to the optical fiber, the optical amplifier being configured to supply a constant gain to each input optical signal over a specified range of input optical signal power, each optical link being configured such that the power level of each optical signal provided to each optical amplifier is within the specified range of input optical signal power to avoid attaining deep saturation of the cascaded optical amplifiers;
   optical signal-to-noise ratio (OSNR) measuring circuitry operative to measure the OSNR of an optical communications signal received at the receiver from the transmitter via the optical links by measuring amplified spontaneous emission (ASE) noise and optical signal power at the receiver, the OSNR measuring circuitry including a photodetector following a taper coupler and dual gain circuitry operative to selectively apply either a high gain or a low gain to the signal being measured;
   transmitter power adjusting circuitry operative to adjust the optical power of the optical communications signal transmitted by the transmitter to the receiver via the optical links; and
   a controller coupled between the OSNR measuring circuitry and the transmitter power adjusting circuitry, the controller being operative to control the dual-gain circuitry to apply high gain when the ASE noise is being measured and low gain when the optical signal power is being measured, the controller being further operative to adjust the optical power of the optical communications signal transmitted by the transmitter to attain a desired OSNR at the receiver independently of the optical power levels of the other optical communications signals carried on the path from the transmitter to the receiver.

2. An optical communications network according to claim 1, wherein the optical amplifiers are erbium-doped fiber amplifiers.

3. An optical communications network according to claim 1, wherein the optical amplifiers include semiconductor optical amplifiers and Raman optical amplifiers.

4. An optical communications network according to claim 1, wherein the transmitter adjusting circuitry comprises a variable optical attenuator.

5. An optical communications network according to claim 1, wherein the controller is a network management system.

6. An optical communications network according to claim 1, wherein each optical link further comprises a variable optical attenuator, each variable optical attenuator being set to ensure that the power level of the optical signal provided to each optical amplifier is within the specified range of input optical signal power.

7. An optical communications system according to claim 6, wherein the variable optical attenuator in each link is located at the output of the respective optical amplifier.

8. An optical communications system according to claim 6, wherein the variable optical attenuator in each link is located at the input of the respective optical amplifier.

9. An optical communications system according to claim 6, wherein the variable optical attenuator in each link is located at a mid-point of the respective optical amplifier.

10. An optical communications system according to claim 1, wherein the number of optical links is one.

11. A method of operating an optical communications network having a number of optical links extending between an optical transmitter and a corresponding optical receiver, each optical link having one or multiple fiber spans, each fiber span including an optical amplifier and an optical fiber operative to carry wavelength-division multiplexed (WDM) optical communications signals in the direction from the transmitter to the receiver, the method comprising:
    configuring the optical amplifier in each link to supply a constant gain to each input optical signal over a specified range of input optical signal power;
    configuring each optical link such that the power level of each optical signal provided to each optical amplifier is within the specified range of input optical signal power;
    measuring the optical signal-to-noise ratio (OSNR) of an optical communications signal received at the receiver from the transmitter via the optical links by measuring amplified spontaneous emission (ASE) noise and optical signal power at the receiver, the OSNR measuring including applying a high gain when the ASE noise is being measured and applying a low gain when the optical signal power is being measured; and
    adjusting the optical power of the optical communications signal transmitted by the transmitter to attain a desired OSNR at the receiver independently of the optical power levels of the other optical communications signals carried on the path from the transmitter to the receiver.

12. A method according to claim 11, wherein measuring the OSNR at the receiver comprises detecting respective optical power levels with the transmitter on and off.

13. A method according to claim 11, wherein configuring each optical link to provide an optical signal within the specified range to the amplifier comprises adjusting a variable optical attenuator in each link.

14. A method according to claim 11, wherein adjusting the optical power of the transmitted signal comprises changing the attenuation of a variable optical attenuator placed between the transmitter and the optical communications network.

* * * * *

UNITED STATES PATENT AND TRADEMARK OFFICE
CERTIFICATE OF CORRECTION

PATENT NO.    : 6,400,479 B1
DATED         : June 4, 2002
INVENTOR(S)   : Jianying Zhou et al.

It is certified that error appears in the above-identified patent and that said Letters Patent is hereby corrected as shown below:

Column 6,
Line 14, "OSNR_i=P_signal_on-P_i_ase_ref    (4)" should read
-- OSNR_i=P_i_signal_on-P_i_ase_ref    (4) --.

Signed and Sealed this

Tenth Day of June, 2003

JAMES E. ROGAN
*Director of the United States Patent and Trademark Office*